US009710853B2

(12) United States Patent
Blank et al.

(10) Patent No.: US 9,710,853 B2
(45) Date of Patent: *Jul. 18, 2017

(54) SYSTEM AND METHOD FOR COMPUTER IMPLEMENTED COLLATERAL MANAGEMENT

(71) Applicant: THE BANK OF NEW YORK MELLON, New York, NY (US)

(72) Inventors: Brian Blank, Manalapan, NJ (US); Lyn Leshe, Hillsborough, NJ (US); Simon Noakes, Colchester (GB); Srivalli Tadimeti, Scarsdale, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,430

(22) Filed: Oct. 19, 2012

(65) Prior Publication Data

US 2013/0097066 A1 Apr. 18, 2013

Related U.S. Application Data

(63) Continuation-in-part of application No. 13/368,952, filed on Feb. 8, 2012, now Pat. No. 8,315,939, which (Continued)

(51) Int. Cl.
*G06Q 40/00* (2012.01)
*G06Q 40/04* (2012.01)
*G06Q 40/06* (2012.01)

(52) U.S. Cl.
CPC ............. *G06Q 40/04* (2013.01); *G06Q 40/06* (2013.01); *G06Q 40/12* (2013.12)

(58) Field of Classification Search
CPC ......... G06F 10/00; G06F 30/00; G06Q 30/00; G06Q 40/00; G06Q 10/00; G06Q 20/00

(Continued)

(56) References Cited

U.S. PATENT DOCUMENTS 5,802,499 A * 9/1998 Sampson et al. ............... 705/35
6,018,721 A * 1/2000 Aziz .................... G06Q 40/025
705/36 R (Continued)

OTHER PUBLICATIONS

International Search Report and Written Opinion as issued for International Patent Application No. PCT/US2011/043235, dated Oct. 20, 2011.

(Continued)

*Primary Examiner* — Frantzy Poinvil
(74) *Attorney, Agent, or Firm* — Pillsbury Winthrop Shaw Pittman LLP

(57) ABSTRACT

A data processing system manages collateral risk associated with a trade of a financial instrument includes memory coupled to a processor, the memory containing a database configured to store a ruleset relating to determining eligibility of collateral to be considered for a desired trade. A collateral analysis module determines a collateral preference ranking of one or more security positions eligible for use as collateral for the trade by applying the ruleset via an algorithm executed by the processor so as to confirm an eligibility of security positions eligible for use as collateral for the trade by testing in accordance with the ruleset.

25 Claims, 6 Drawing Sheets

Figure 1:
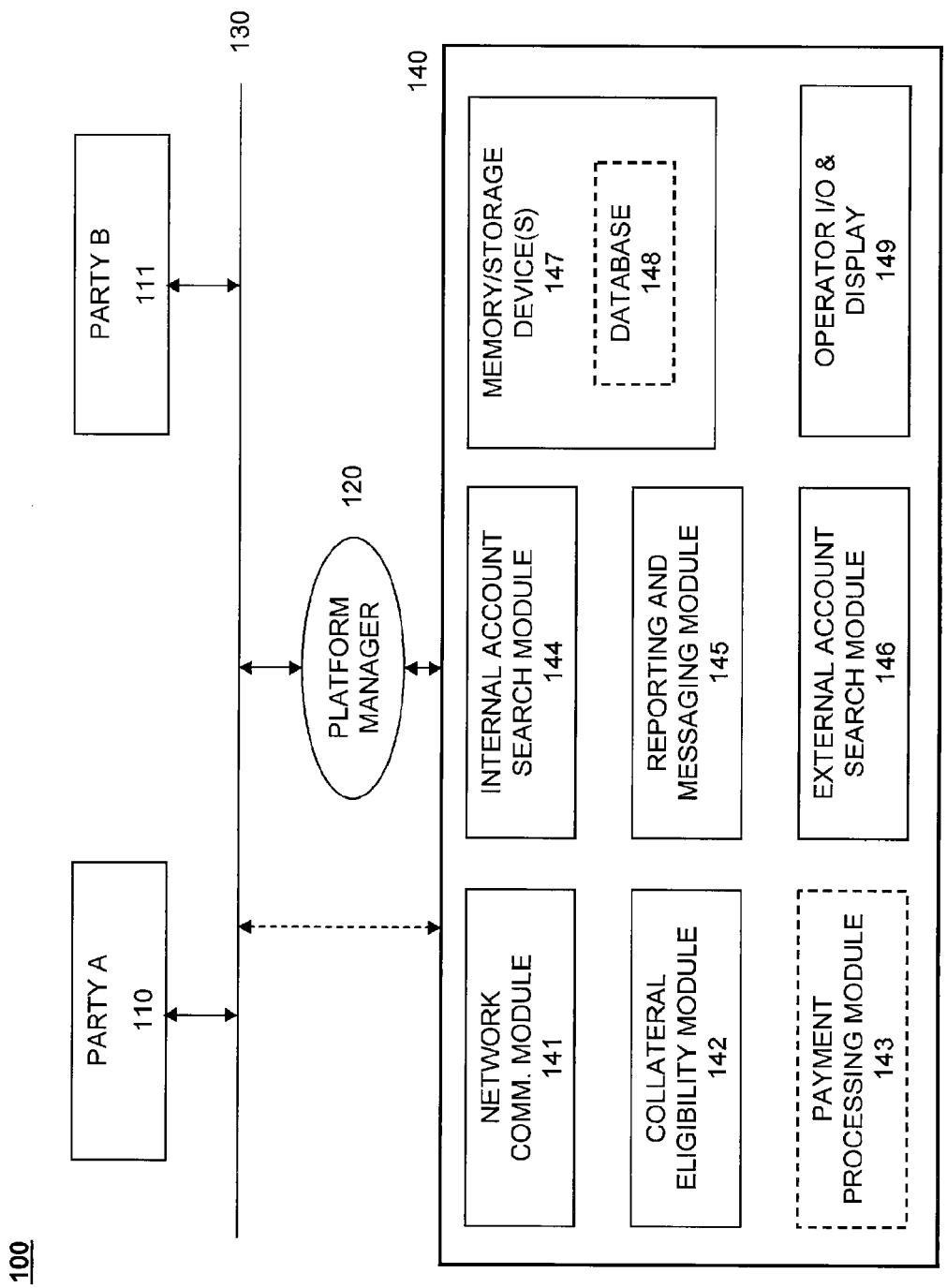

Related U.S. Application Data is a continuation of application No. 12/832,428, filed on Jul. 8, 2010, now Pat. No. 8,145,552.

(58) Field of Classification Search
USPC .................................................. 705/3–440
See application file for complete search history.

(56) References Cited

U.S. PATENT DOCUMENTS

| | | | |
|---|---|---|---|
| 7,584,139 B2* | 9/2009 | Goodwin | G06Q 30/08 705/35 |
| 7,734,538 B2* | 6/2010 | Bauerschmidt et al. | 705/38 |
| 7,797,230 B1 | 9/2010 | Barie et al. | |
| 7,818,237 B1 | 10/2010 | Efron et al. | |
| 7,917,427 B2 | 3/2011 | Fitzpatrick et al. | |
| 8,145,552 B2 | 3/2012 | Blank | |
| 8,392,308 B2* | 3/2013 | Fudali | G06Q 40/025 705/35 |
| 8,452,681 B2* | 5/2013 | Clements | G06Q 40/00 705/35 |
| 8,666,866 B1* | 3/2014 | Groz | G06Q 40/00 705/35 |
| 8,762,246 B2 | 6/2014 | Blank et al. | |
| 2001/0037284 A1 | 11/2001 | Finkelstein et al. | |
| 2003/0023539 A1 | 1/2003 | Wilce et al. | |
| 2007/0118455 A1* | 5/2007 | Albert et al. | 705/37 |
| 2008/0215480 A1 | 9/2008 | Mordecai | |
| 2008/0301062 A1 | 12/2008 | Glinberg et al. | |
| 2009/0192946 A1 | 7/2009 | Buckmaster | |
| 2009/0234776 A1 | 9/2009 | Bauerschmidt et al. | |
| 2010/0228665 A1 | 9/2010 | Mathieson et al. | |
| 2011/0178956 A1* | 7/2011 | Glinberg et al. | 705/36 R |
| 2012/0047062 A1 | 2/2012 | Robinson | |
| 2012/0136808 A1* | 5/2012 | Blank | 705/36 R |
| 2012/0166328 A1* | 6/2012 | Spirgel | 705/37 |
| 2015/0287140 A1* | 10/2015 | Wang | G06Q 40/06 705/36 R |

OTHER PUBLICATIONS

International Preliminary Report on Patentability as issued for International Application No. PCT/US2011/043235, dated Sep. 17, 2012.

European Communication pursuant to rules 70(2) and 70a(2) EPC including Search Report as issued for European Application No. 11804359.5, dated Apr. 15, 2016, 7 pages.

* cited by examiner

FIG. 2

FIG. 3

SYSTEM AND METHOD FOR COMPUTER IMPLEMENTED COLLATERAL MANAGEMENT

CROSS-REFERENCE TO RELATED APPLICATIONS

This application is a continuation in part of U.S. patent application No. 13/368,952, filed 2/08/2012, entitled "System and Method for Computer Implemented Collateral Management", which is issued as U.S. Pat. No. 8,315,939 which is a continuation of U.S. patent application 12/832,428, filed 07/08//2010, entitled "System and Method for Computer Implemented Collateral Management", which is issued as U.S. Pat. 8,145,552. The entire contents of each of these applications are incorporated herein by reference.

BACKGROUND

This application is directed to a computer-implemented system and method useful for managing collateral associated with the trade of financial instruments. In particular, this application is directed to a computerized system and method for assessing the eligibility of a particular financial security for use as collateral in a financial transaction, e.g., tri-party financing, stock lending transactions, or other financial transactions.

In global capital markets, timely and complete information is critical, especially when collateral is at stake. With increased risk aversion and increasingly complex credit requirements prevalent in the financial markets, finding the right collateral for a collateralized transaction can be a challenging task, particularly in providing trading parties the ability to derive maximum value from their collateral holdings in a secure and controlled manner. The ability to assess what securities can be used as collateral, and with whom, is vital to the efficiency of using collateral.

What is needed is a system and method for managing collateral in a financial transaction. What is further needed is a computer-implemented system and method that simplifies the identification of securities contemplated as collateral for a financial transaction, expedites securities transfers between receivers and providers of collateral in financial transactions, and which reduces the risk to both parties associated with over and/or under collateralization.

SUMMARY

Through various embodiments described herein, the system and method of this disclosure reduces the risk and complexity associated with collateralized financial transactions. For example, various embodiments provide functions related to determining the "position eligibility" of financial instruments in terms of their potential desirability as collateral for a particular trade. Various aspects provide the ability to search and analyze accounts based upon different criteria, and may include securities that are or are not held in custody by the operator of the system. Results of the collateral eligibility search may be downloaded into spreadsheet form for further analysis, or shared electronically over a network.

Various embodiments of this disclosure may be used in conjunction with existing financial services platforms, for example the Bank of New York Mellon's tri-party repurchase agreement products (RepoEdge®) which allow clients to outsource the operational aspects of their collateralized transactions, and Derivatives Margin Management (DM Edge®), which helps clients manage credit risks associated with derivatives transactions by enabling them to accept, monitor and re-transfer collateral. These services, among others such as Repo Margin Management (RM Edge®), MarginDirect$^{SM}$, and Derivatives Collateral Net (DCN), may be delivered to clients through AccessEdge$^{SM}$, a real-time, web-based portal.

The operator/manager of the system and method of this disclosure acts as a third-party service provider to the two principals to a trade, and the various functions performed by the system and method provide value-added services which mitigate risk and lead to greater efficiencies for both parties.

In one or more embodiments, the position eligibility feature described herein provides fast and intuitive results, and allows users to screen securities on-line without the assistance of the system operator and without having to separately provide securities for eligibility screening, and to assess whether a particular security can be used as collateral and financing or stock lending transactions with existing customer bases.

In one or more embodiments, a data processing system for managing collateral risk associated with a trade of a financial instrument includes memory coupled to a processor, the memory containing a database therein configured to store a ruleset relating to determining eligibility of collateral to be considered for a desired trade; and a collateral analysis module that determines a collateral preference ranking of one or more security positions eligible for use as collateral for the trade by applying said ruleset via an algorithm executed by said processor so as to confirm an eligibility of said one or more security positions eligible for use as collateral for the trade by testing in accordance with the ruleset.

In another embodiment, a computer-implemented method for managing collateral risk associated with a trade of a financial instrument includes determining, in a data processing system comprising memory coupled to a processor, an eligibility of potentially eligible security positions as collateral for the trade by applying one or more user-definable rulesets in an algorithm executed by the processor by testing an eligibility of each of the potentially eligible security positions as collateral for the trade, said testing an eligibility comprising testing an eligibility along each of a plurality of logical paths defined by the one or more user-definable rulesets; and causing the processor to output a relative collateral preference indication.

In another embodiment, an article of manufacture comprising a tangible computer-readable medium that contains computer-executable code thereon which, when executed by a processor, causes the processor to carry out functions that manage collateral risk associated with a trade of a financial instrument, wherein the executed code is operable to: determine an eligibility of potentially eligible security positions as collateral for the trade by applying one or more user-definable rulesets in an algorithm executed by the processor by testing an eligibility of each of the potentially eligible security positions as collateral for the trade, said testing an eligibility comprising testing an eligibility along each of a plurality of logical paths defined by the one or more user-definable rulesets; and cause the processor to output a relative collateral preference indication.

The system and method of this disclosure provides various capabilities as discussed more fully in the detailed description below.

BRIEF DISCUSSION OF THE DRAWINGS

Figure 4A:
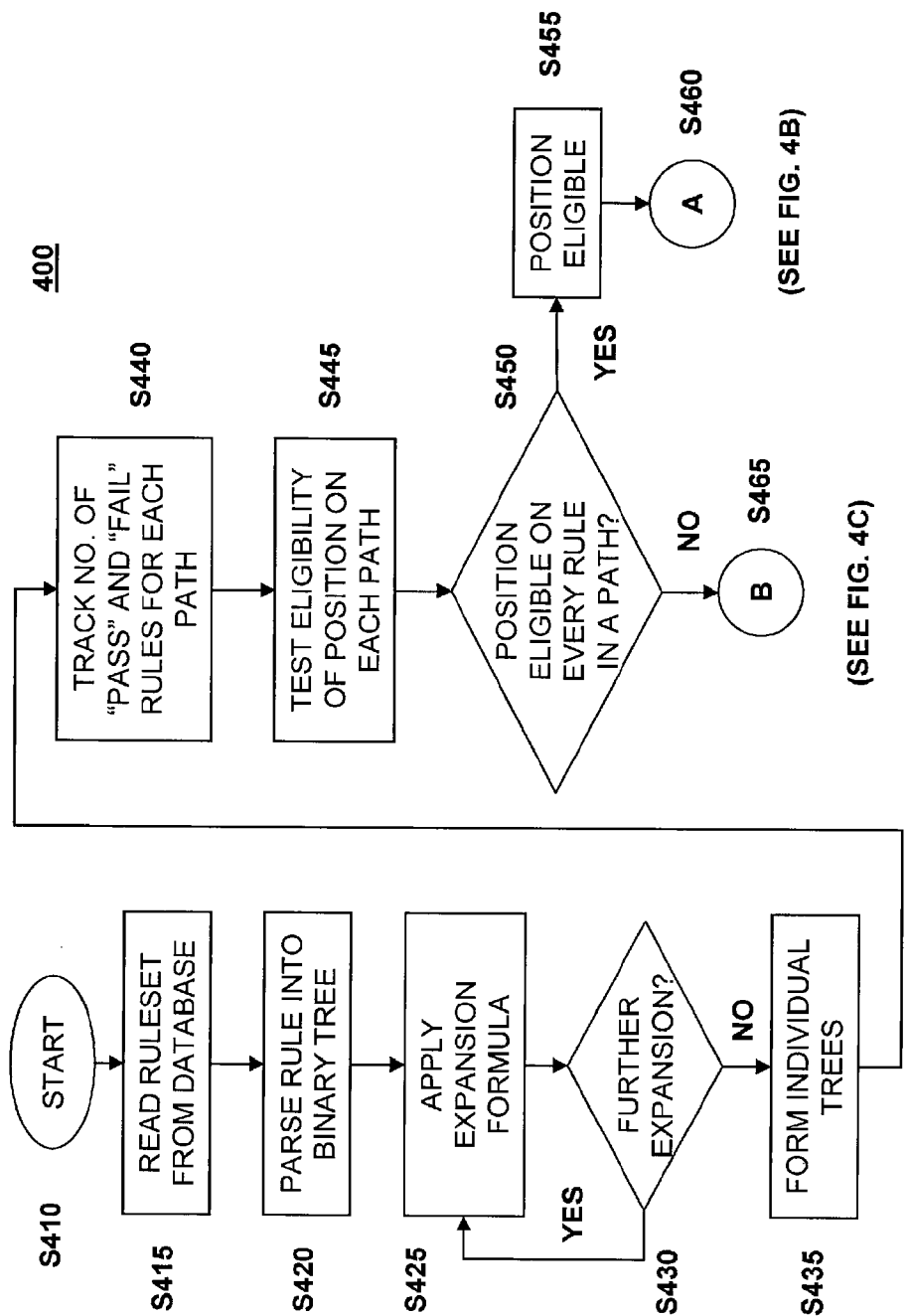
Figure 4B:
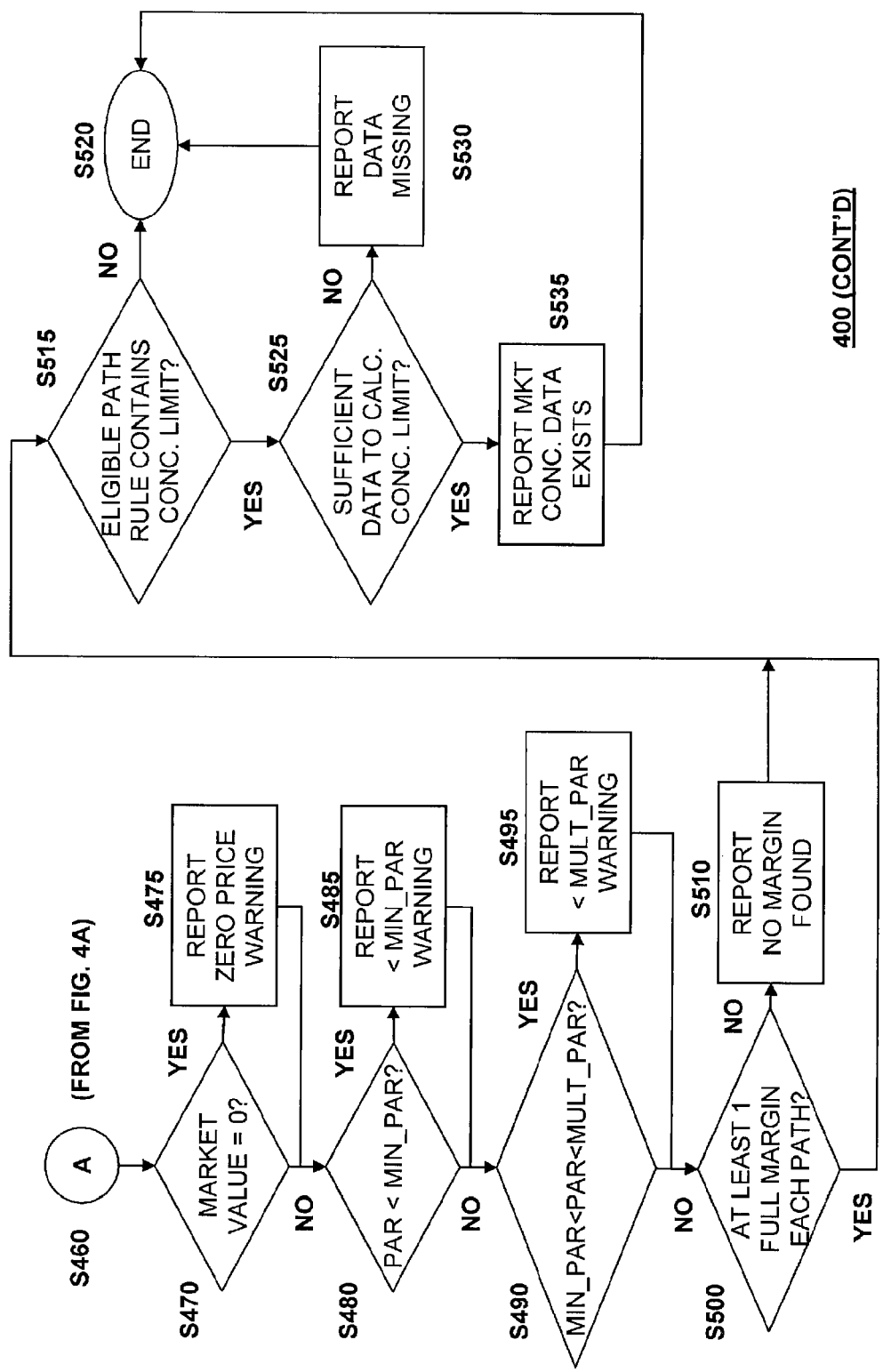
Figure 4C:
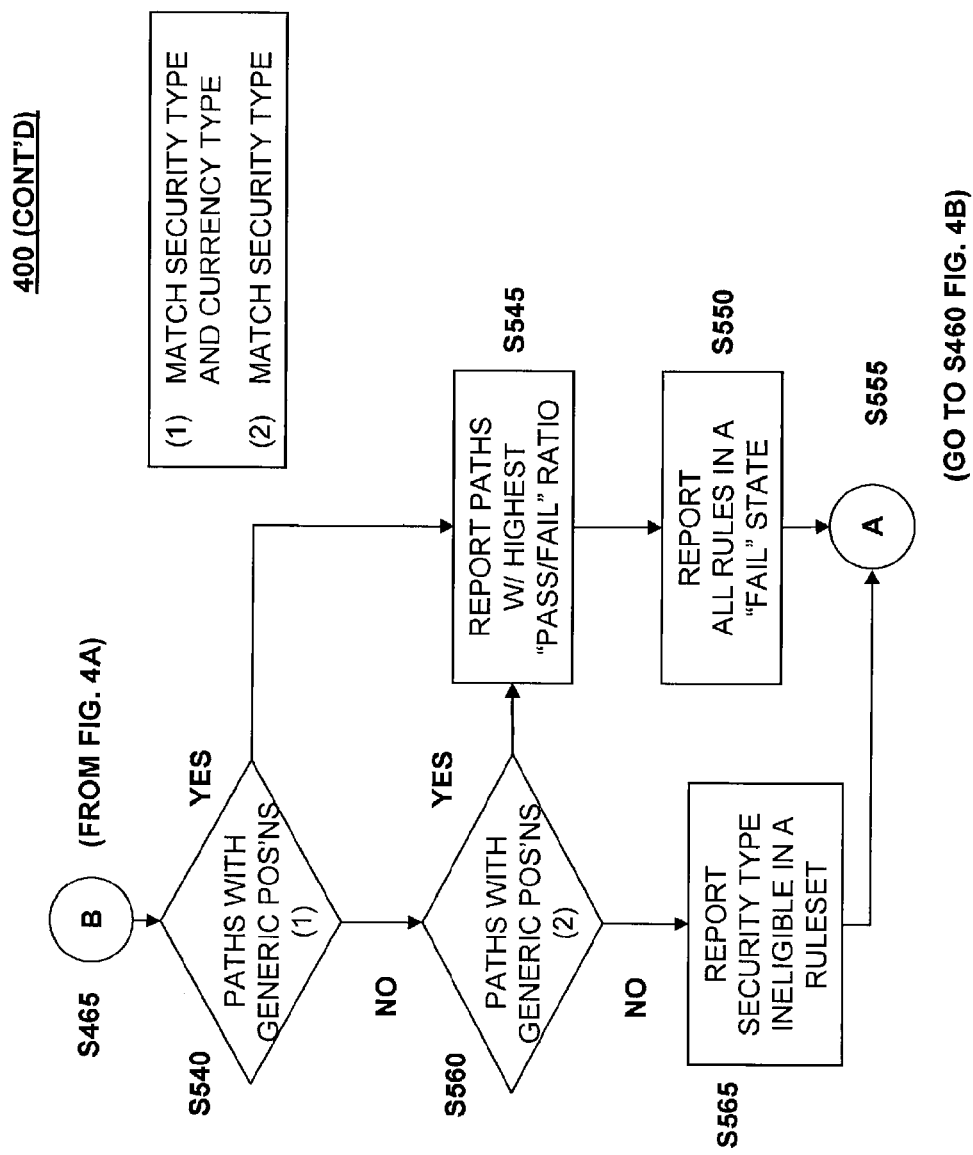

FIG. 1 provides a functional block diagram of an embodiment of a computer-implemented and networked system for collateral management;

Figure 2:
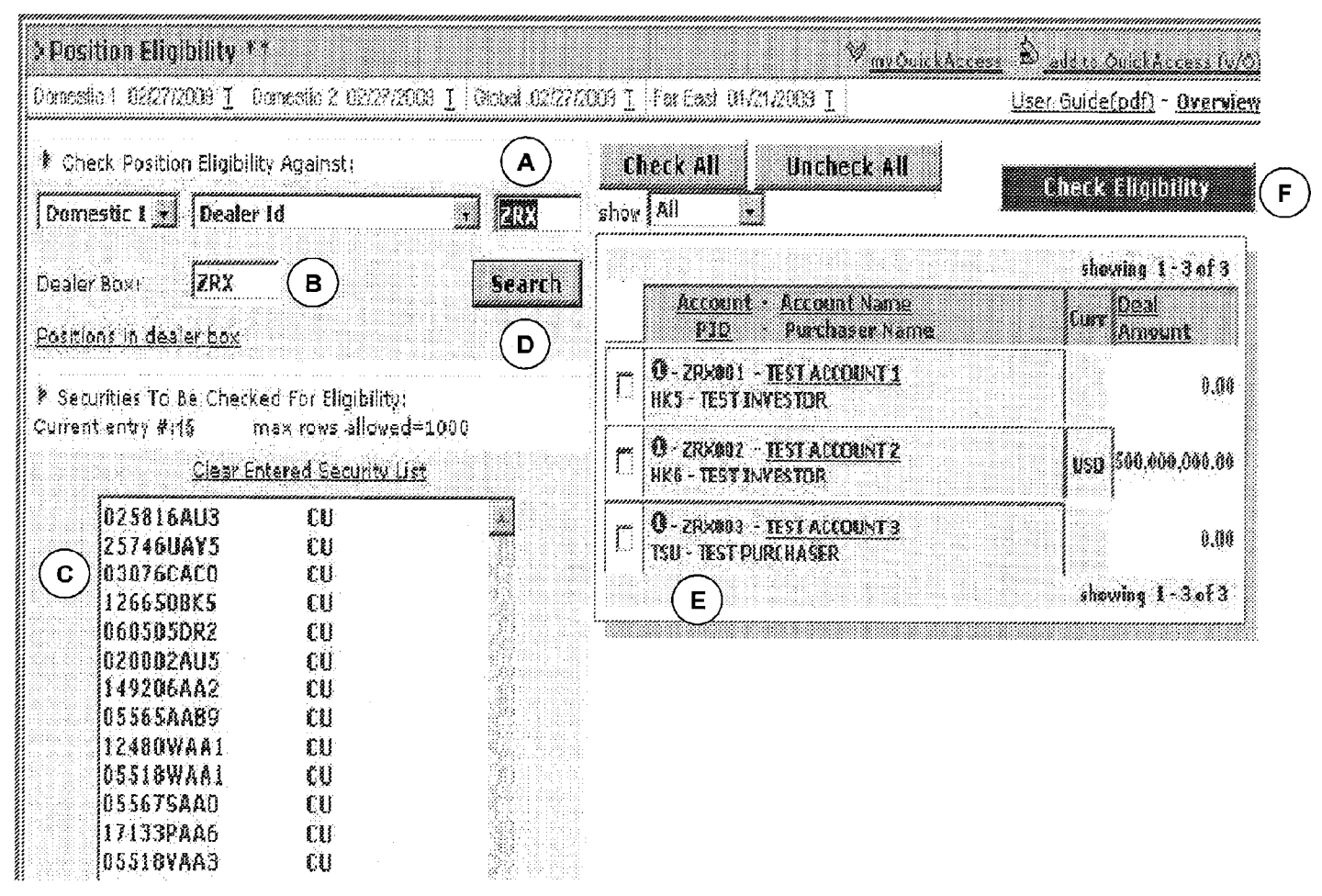

FIG. 2 provides an illustrative screen shot representing a Position Eligibility Screen that may be used in a graphical user interface of an embodiment of this disclosure;

Figure 3:
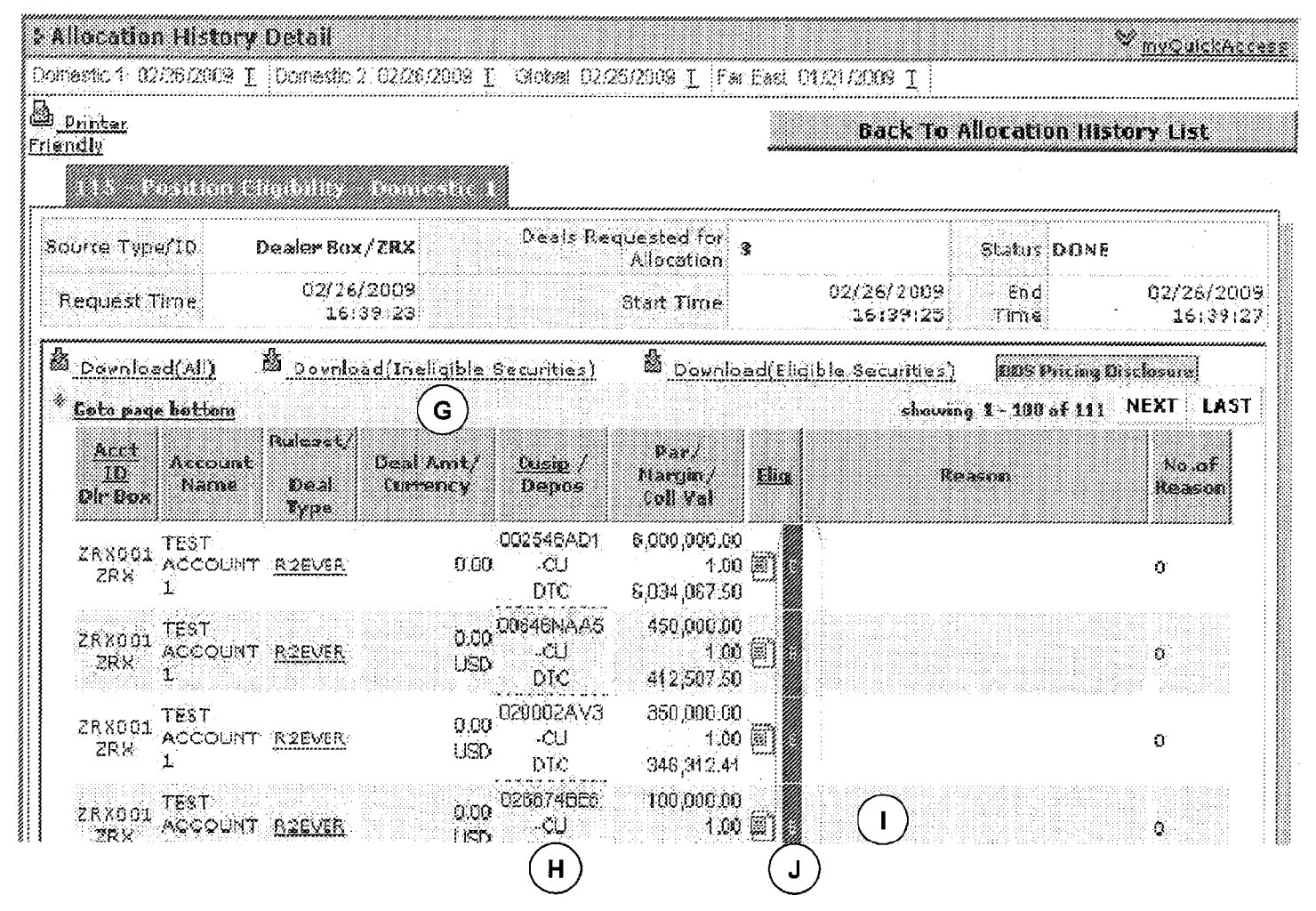

FIG. 3 provides an illustrative screen shot representing an Allocation History Detail Screen that may be used in a graphical user interface of an embodiment of this disclosure; and FIGS. 4A-4C illustrate a logic flowchart that implements a position eligibility algorithm and other rules relating to collateral eligibility determination in an embodiment of this disclosure.

DETAILED DESCRIPTION

In the discussion of various embodiments and aspects of the system and method of this disclosure, examples of a processor may include any one or more of, for instance, a personal computer, portable computer, personal digital assistant (PDA), workstation, mainframe, server, or other processor-driven device, and examples of network may include, for example, a private network, the Internet, or other known network types, including both wired and wireless networks. In some embodiments, a processor may be understood as a clustered computing system or other distributed processing mechanism, which may be configured to support the processing of large sets of data.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

The Appendix to this disclosure, described herein, provides an exemplary algorithm which may be implemented through computer software running in a processor to determine the "position eligibility" of various "security positions", i.e., ownership of a particular security or financial instrument. Of course, this algorithm is not intended to be limiting, but merely to describe one way of accomplishing the functions associated with determining collateral position eligibility.

In the discussion of various embodiments and aspects of the system and method of this disclosure, examples of trading parties include, but are not limited to, broker-dealers, institutional investors, and hedge fund managers.

In various embodiments, a web-based collateral management system or platform links dealers with investors to conduct collateral transactions in a safe, efficient, and reliable way. Online dealers and investors can manage collateral among a diverse range of instruments, including tri-party repo agreements in all major currencies, securities lending transactions, municipal deposits, bank loans, derivatives transactions, letters of credit, and structured trades, for example.

The system and method of this disclosure provide control and complete transparency of how collateral is managed, along with providing comprehensive screening and selection capabilities to enable precise transactions with the right collateral at the right time. Further, the system and method of this disclosure enables dealers to obtain attractive financing and helps investors make more informed decisions regarding collateral optimization so as to reduce the risk of over or under collateralization.

Acting as an agent of both parties to the trade, the custodian/manager of the system and method of this disclosure can provide daily mark-to-market valuations, haircuts/margins, and concentration limits (i.e., maintain percentages of market capitalization, dollar amount limits for a particular security, or a percentage of the portfolio in a particular security, for example), as well as manage, track, and settle collateral transactions across global capital markets by working collaboratively with clients to provide collateral transparency. The "position eligibility" functionality of embodiments of this disclosure allows broker dealers to pre-screen securities online, and to assess whether the securities can be used as collateral in tri-party financing or stock lending transactions. Other functions of the position eligibility function include the ability to search accounts based on different criteria, and include securities that are either held or not held in custody by the platform/system manager, e.g., The Bank of New York Mellon. Analytical results can be downloaded into standard spreadsheet software for further analysis.

Turning now to the drawing figures, the embodiment of FIG. 1 illustrates a functional block diagram of trading system 100 in which party 110 and party 111 access collateral management system 140 via network 130 and platform manager 120, or optionally bypasses platform manager 120. Collateral management system 140 may include network communication module 141 configured to process external communications between collateral management system 140 and network 130. Collateral eligibility module 142, described below, is configured using one or more processors (not shown) to evaluate various security positions in terms of their suitability as collateral for a particular financial trade or transaction. Payment processing module 143, indicated in dashed lines, represents optional functionality associated with business payment activities for services rendered by the system manager in processing and evaluating collateral for a financial trade. Internal account search module 144 may be configured to search one or more databases associated with client assets held in custody for, or for the benefit of various existing clients of platform manager 120. Internal account search module 144 may be configured to search for a particular type of security or asset, a particular security issuer, or a security rating, for example. Similarly, external account search module 146 may be configured to search various parameters associated with accounts that are not held in custody or for the benefit of existing clients of platform manager 120. Reporting and messaging module 145 may be configured to provide standard and/or custom report and messaging formats that may be transferred to network 130 by collateral management system 140, (optionally) through platform manager 120, or through an alternate communications path illustrated by the dashed double-ended arrow in FIG. 1. Memory storage device(s) 147 may include one or more databases 148 therein. Memory storage device 147 may be any type of conventional storage mechanism for example, random access memory (RAM), and database 148 may be any type of appropriate database, as would be known by a person of ordinary skill in the art, for example. Operator input/output and display module 149 represents various techniques and computer peripheral devices for providing operator input and output to collateral management system 140.

It may be appreciated that in some embodiments the collateral management system 140 may support industry standard and/or proprietary input and output interfaces. These interfaces may be utilized to coordinate with other financial systems across the network 130, and may manage data flows within the collateral management system 140. As non-limiting examples, SWIFT and XML standards may be utilized for interfaces within the collateral management system 140, or to coordinate the collateral management system 140 with other financial systems. In some embodiments, the collateral management system 140 may be configured to receive messages asking for confirmation of eligibility of collateral/positions, or reasons of ineligibility. In an embodiment, after verifying the position eligibility or ineligibility, as described in greater detail below, the collateral management system 140 may be configured to respond via messaging. It may be appreciated that file based input and output interfaces may additionally or alternatively be supported, as manual data entry.

The system and method of this disclosure may be implemented in various ways, including a graphical-user-interface (GUI) as represented, at least in part, by FIG. 2, which illustrates one possible implementation of a "screenshot" that represents initial "Position Eligibility Screening". It may be appreciated that access to the GUI, or the functionality of the GUI, may be restricted based on a user login, or other security protocol. In some embodiments, for example, the user login may determine which collateral may be accessed for eligibility testing and/or which accounts may be viewed to test the eligibility against. The circled letters in FIGS. 2 and 3 will now be addressed in turn.

Letter "A" in the window of FIG. 2 provides an input entry area to identify accounts to be searched by dealer ID, account, subdivide group, or by purchaser ID. Letter "B" provides an input area via the GUI to identify a source account that contains the securities positions, i.e., securities contemplated for use as collateral that are held in custody by a custodian or platform manager associated with collateral management system 140, and which should be checked for collateral eligibility. Letter "C" denotes an area in which securities to be checked for eligibility may be entered, with the option to add additional securities that are not held in custody by the custodian or platform manager associated with collateral management system 140, and for which collateral position eligibility is desired to be checked. While in some embodiments the securities may be typed in manually, in other embodiments the securities may be loaded from a data file or other data source. In some embodiments, the securities to be checked for collateral position eligibility may be entered according to a code convention (e.g., CUSIP, ISIN, or so on). In an embodiment, entry of a code may prompt the collateral management system 140 to check the code for errors (e.g., by utilizing one or more check digits in each code). In an embodiment, entering a security may comprise verifying that details of the security are accessible by the collateral management system 140 so as to permit the eligibility check. In some embodiments, if an entered security is not set up in the collateral management system 140, an indication of that fact may be presented to the user of the GUI, and/or the security may be removed from the list of securities to be checked in area "C." In an embodiment where the security lacking details (or otherwise not set up in the collateral management system 140) is not automatically removed from the list of securities to be checked, the collateral management system 140 may be configured to prevent the eligibility check from commencing until the security lacking details is removed from the list.

It may be appreciated that in some embodiments, inputs of securities to be checked into the collateral management system 140 may be in the form of indexes or groups of securities. For example, the GUI may include a search feature associated with the area "C" configured to search across all known securities (including, for example, those associated with the party 110 or 111 accessing the collateral management system, or all securities that have been loaded from a data file) to allow for selection of a subset of them for checking position eligibility thereof For example, the search feature may allow for selection of the securities having particular features (e.g., corporate bonds, securities within a particular rating range, and so on). The securities meeting the search criteria may be listed (e.g., in a popup, or in another region of the GUI), and may have checkboxes next to them associated with selecting them to be checked for collateral position eligibility. In an embodiment, those securities selected in the search at area "C" may be added to the list of securities to be checked at area "C." Other appropriate methods of checking the eligibility of an index or group of securities may additionally or alternatively be implemented.

In the illustrated embodiment, Letter "D" denotes a "radio button" used to commence a search, which displays the selected account groups in result window "E", which displays a list of accounts and the available collateral in each account. From the list at Letter "E", an analyst or trader using the system can select specific accounts to be checked for position eligibility. After specifying the accounts to be checked for position eligibility, selecting the "check eligibility" (the soft button at Letter "F"), an eligibility check may be run between the collateral (e.g., those listed at area "C") and the selected account groups (e.g., those of area "E"). It may be appreciated that in some embodiments, the eligibility check may be against selectable groups of accounts, instead of one or more individual accounts. For example, instead of comparing collateral with particular accounts matching the search criteria being listed in area "E," the search may return particular groups of accounts (e.g., long term accounts, short term accounts, or so on) and the group itself may be selected for the position eligibility check.

Once the eligibility check has started, it takes into account all rules agreed for each account, and then compares the securities against these rules. Results of the check may be stored intra-day in the user's allocation history, allowing a user to go back and look at the results of previous eligibility checks. These results can then be downloaded into a spreadsheet file or provided directly to the dealer for further analysis via a File Transfer Protocol (FTP), for example. User-defined rulesets may be input through Operator I/O and Display 149, for example. In an embodiment, validation of ruleset creation may be supported by the collateral management system 140. Specifically, it may be appreciated that a ruleset is a complex tool, where mistakes may be relatively easy to make. To ascertain whether a mistake has been potentially made by a ruleset administrator, the collateral management system 140 may be configured to test eligibility of various collaterals against the ruleset with a pre-determined eligibility profile. In an embodiment, any positions found to have a different eligibility profile than that manually created for that position may be reported to the ruleset administrator as an exception. In an embodiment, the exceptions may be confirmed, or the ruleset may be edited to correct the potential mistake.

Examples of entities and concentration types that may be used in developing various rules for evaluating securities for their eligibility as collateral are provided in Tables I and II, respectively.

TABLE I

ENTITIES

| Entity ID | Entity Description | Value |
|---|---|---|
| 0 | Broad Type | This is a 4 character field. This field represents a grouping of Security Sub-Groups (entity #20 below). An example is EQTY (Equity) and VTBL (Convertible) |
| 1 | Issuer | This is a 4 or 6 character field representing the BNY issuer id. An example is 000119 (Currently this is Nike, Inc.) |
| 2 | Country of Origin | 3 letter ISO Country code representing the domicile country of origin of the Issuer. An example is USA (United States) |
| 3 | Security Type | 4 byte BNY specific security type. An example is BOND (U.S. Treasury Bond). |
| 4 | Position Currency | 3 letter ISO Currency Code. An example is USD (United States Dollar) |
| 5 | Perpetual | Is the security perpetual? YES or NO |
| 6 | Security ID | The first two characters refer to the type of identifier (CU for CUSIP, IS for ISIN, CC for Common Code, SE for SEDOL). A colon follows this. The security identifier follows this. |
| 7 | Depository | This is the BNY code for the depository. An example is ECLR for Euroclear. |
| 8 | Tags | This is a BNY tag. Tags can be used to specify indices or any other useful information about a security. |
| 9 | Security Rating | This represents the rating of the security by S & P, Moodys, or Fitch, along with the rating source. Please refer to the ratings scale table 2.4 and the rating operators in table 2.2. Note that this entity will have a compound value in the 04 record as noted above. |
| 10 | Issuer Rating | This represents the rating of the Issuer by Finch, S & P, or Moodys, along with the rating sources. Please refer to the ratings scale table 2.4 and the rating operators in table 2.2. Note that this entity will have a compound value in the 04 record as noted above. |
| 11 | Months To Maturity | This represents the months to maturity of the security. |
| 12 | Priority | This does not determine the eligibility of a security. It only determines the sort order of the positions during allocation time. The lower the number, the sooner it will be allocated. |
| 13 | Number of Rating Sources | This specifies the number of rating sources that should be present for each eligible position, along with the rating sources. Currently, there are three sources (S & P, Moodys, and Fitch). The number will range between 0 and three. Note that this entity will have a compound value in the 04 record as noted above. |
| 14 | Weighted Average Maturity (WAM) | This is used to specify a weighted average of the months to maturity at the account level. If a position can't be allocated because it would break the WAM, then it is put aside and retested at a later phase in the allocation. This rule will always be "ANDed" with every other rule in the ruleset. |
| 16 | Weighted Average Credit Rating (WACR) | This is used to specify a weighted average of the Security Rating at the account level. Ratings are translated into numbers using the ratings scale table 2.4. If a position can't be allocated because it would break the WACR, then it is put aside and retested at a later phase in the allocation. This rule will always be "ANDed" with every other rule in the ruleset. |
| 18 | Issuer Group | This is a BNY Issuer group. This represents a grouping of issuers (entity #1). Currently, there are no Issuer groups on the system to give you an example. |
| 19 | Security Price | This is the price of one par of the security. |
| 20 | Security Sub-Group | This is a BNY grouping of the sec types (entity #3). |
| 21 | Deal Currency | This is the currency of the deal (not of the position). |
| 22 | Deal Type | This is the type of the deal. R—Rollover, T—Term, O—Overnight |
| 25 | Coupon Rate | This is the coupon rate of a security. |
| 26 | Market Capitalization | This is the market capitalization expressed in USD |
| 36 | Dealer Box | This represents the source dealer box of the collateral. |
| 37 | Calendar Days to Maturity | The time to maturity for a security, expressed in calendar days. This provides a finer-grained range than the Months to Maturity entity. |
| 39 | Record Date | Indicates whether or not the security should be used on the record date of the dividend payment. This will be either 1 (Include) or 0 (Exclude). |
| 40 | Security Price in USD | This is the price of one par of the security expressed in USD. This is in contrast to the Security Price entity that expresses the price of one par in the issuing currency. |
| 41 | Market Capitalization | This is the number of outstanding shares times the Security Price in USD. |
| 42 | GICS Sector Code | The GICS Sector Code for the security. |
| 43 | GICS Sub-Industry Code | The GICS Sub-Industry Code for the security. |

TABLE II

CONCENTRATION TYPES

| Concentration Type | Description |
| --- | --- |
| **% | The concentration limit is a percentage of the portfolio. The concentration limit must be between (but not including) 0 and 100. |
| **P | The concentration limit is a Par value. |
| *M1 | The concentration limit is Y times yesterdays traded volume where Y is the specified concentration limit. |
| *M2 | The concentration limit is Y times the 2-day average traded volume where Y is the specified concentration limit. |
| *M3 | The concentration limit is Y times the 3-day average traded volume where Y is the specified concentration limit. |
| *M4 | The concentration limit is Y times the 4-day average traded volume where Y is the specified concentration limit. |
| *M5 | The concentration limit is Y times the 5-day average traded volume where Y is the specified concentration limit. |
| *M3 | The concentration limit is Y times the 30-day average traded volume where Y is the specified concentration limit. |
| *M6 | The concentration limit is Y times the 60-day average traded volume where Y is the specified concentration limit. |
| *M9 | The concentration limit is Y times the 90-day average traded volume where Y is the specified concentration limit. |
| *MC | The concentration limit is Y percent of the Market Cap where Y is the specified concentration limit (a number between 0 and 100). |

The Rest of the concentration limits represent Currency Concentration Limits for various currencies. The concentration limit specified must be in the currency specified and will be the maximum cash value of the position that can be allocated.

Eligibility results are based on data which may be provisional and/or unvalidated. It is recommended that the user performs appropriate validation checks prior to executing trades based on these results. Alternately, it is the user/client's responsibility to ensure that sufficient collateral is held by the custodian/manager of collateral management system 140 to cover any obligations, whether based on financial projections or otherwise.

Turning now FIG. 3, a screenshot of an allocation history detail screen is similarly annotated as in FIG. 2. Letter "G" provides a soft button to download results (e.g., in CSV format) representing the full set of data, or a subset of the data as either Eligible or Ineligible positions are returned. Letter "H" shows an area on the screen where specific security information may be displayed, such as margin and collateral value for one or more securities. Letter "I" indicates an area on the screen, where, once completed, the reason(s) why a position is ineligible is presented to the user if the position is ineligible, or is missing the necessary data to make a determination. Reference letter "J" in FIG. 3 shows an indication of eligible collateral by use of the eligibility flag (the letter "E") in the graphical user interface. Alternatively, a security ineligible for use as collateral would have an "I" indication in the column denoted by "J", with a reason for ineligibility provided in the space indicated by the letter "I". While in some embodiments a code associated with a reason(s) may be reported, in other embodiments a description of the reason(s) why the position is ineligible may be reported. In an embodiment, the report, either presented via the GUI, or saved as a spreadsheet or other data file, may be sortable or otherwise displayable in a manner that separates eligible collateral from ineligible collateral. Reasons for ineligibility may include the reasons indicated in TABLE III, below.

TABLE III

INELIGIBILITY REASONS

| Reason Text | Description |
| --- | --- |
| Path Number: # | If more than one path is being reported on, the path number is printed along with all failed rules on that path. If there is a problem with security data that is making that position ineligible, the problem only needs to be corrected on one path to make that position eligible. |
| ENTITY OPERATOR VALUE(S); Position Value: VALUE(S) | For each failed rule being reported, the entity, operator, and value(s) of that rule is display, along with the supporting data from the security position to show why the rule failed. As an example: Months to Maturity < = 12; Position Data: 15 In this example, the rule specifies that the months to maturity must be < = 12, but the security position has a months to maturity of 15 making this rule fail. |

TABLE III-continued

INELIGIBILITY REASONS

| Reason Text | Description |
|---|---|
| No Broad Type or Sec Subgrp Found for Sec Type | The security position has a security type not configured on the system. |
| Sec Type SECURITY_TYPE not eligible. | The security position has a security type not eligible per the specified ruleset. |
| Concentration Limit: No # Day Average Traded Volume received from our regular vendors | The # Day Average Traded Volume is required to calculate eligibility based on a concentration limit, but we do not have this data available to calculate eligibility at this time. # can be one of 1, 2, 3, 4, 5, 30, 60 or 90. |
| Concentration Limit: No Market Cap or Shares Outstanding received from our regular vendors | The Market Cap or Shares Outstanding is required to calculate a concentration limit, but we do not have this data available to calculate eligibility at this time. |
| Margin Error: Incremental margin changed margin to haircut. | An incremental margin in the ruleset changed a margin to a haircut. This is usually due to a ruleset setup problem. |
| Margin Error: Incremental margin changed haircut to margin. | An incremental margin in the ruleset changed a haircut to a margin. This is usually due to a ruleset setup problem. |
| Margin Error: Full margin not found. | A margin or haircut cannot be found in ruleset. |
| Par (#) < Min Par (#) | The available par value is smaller than the minimum required par value. |
| Par (#) < Mult Par (#) | The available par value is smaller than the multiple par value required to allocate. |
| No price received from our regular vendors | This occurs when the market value is zero. This can be caused by a zero value in price, price factor or exchange rate. |
| Security Information Missing. | Security is not known to BNY Mellon at this time. |

It may be appreciated that eligibility and ineligibility criteria discussed herein are merely exemplary, and that eligibility may be determined (or potentially determined) based on other criteria. For example, various account tags may determine whether positions or accounts are to be considered to test eligibility, and if eligibility is to be tested, the account tag may determine the eligibility thereof. For example, in an embodiment an account tag may allow positions with a zero value to be eligible (e.g., for some lockup/segmented accounts). Additionally, in an embodiment an account tag may allow positions to be allocated so that they do not obey minimum/multiple par value requirements (again, for example, for some lockup/segmented accounts). Additionally, in an embodiment an account tag may reset minimum/multiple par to be an integer value that satisfies the original minimum/multiple par. Such an account tag may be required if the dealer's system is implemented utilizing integers instead of floating point numbers. In another embodiment, an account tag might be disabled if a position is in a record date, however enabled to rule the position ineligible if the position is on a path that does not specify the record date. Such an account tag may be implemented so that a record date entry might be added to existing rule sets without modifying all rule sets on a given system.

FIGS. 4A, 4B, and 4C represent a logic flow diagram of a method/process of an embodiment of this disclosure. In FIG. 4A, the process starts at step S410, and continues to step S415, where various rulesets may be read from database 148. As discussed in more detail in the accompanying APPENDIX to this disclosure, rulesets are Boolean expressions that apply logical "AND" and "OR" operators to a set of rules to form a complex expression, which results in either a "TRUE" (eligible) or "FALSE" (ineligible) response. By way of non-limiting example, a ruleset could include a "broad" type of rule in which a type of security may be specified, for example by specifying all types of equities (e.g., stock), or debt (e.g., convertible bonds and/or preferred equities), or commodities such as foreign currency or precious metals. See Rules 1 and 4 in the APPENDIX. As a further rule, the user may further specify the type of security issuer rating to be considered, e.g., "BB" or "Ba2", or a security rating, e.g., "A-", "AA", "Aa2", etc. See Rules 2, 3, and 5 in the APPENDIX. A listing of entities and concentration limits may be found in TABLES I and II, above.

Using known Boolean algebra manipulation techniques at steps S420, S425, and S430, the resulting logical equations/operations can be iteratively expanded into a standard form in which "OR" operators "bubble up" to the top of the binary decision tree, and from which individual "trees" defining a path are formed at step S435. The definition of a "path" is that every rule on the path must be eligible in order for a security position to be eligible on that path.

At step S440, the collateral eligibility module 142 tracks and records various attributes, e.g., the number of "PASS" and "FAIL" rules for each path. In addition, collateral eligibility module 142 may track whether a generic position matching the same security type and position currency could be eligible on that path, or whether a generic position matching the same security type could be else go on that path. Step S445 tests the eligibility of the security position on each path and, if the position is eligible on every rule in a path at step S450, a "POSITION ELIGIBLE" determination is made at step S455, and the process continues to interim node "A" at step S460, which continues on FIG. 4B. if the determination is made at step S450 that the position is not eligible on every rule in the path, the process continues to interim node "B" at step S465, and which continues on FIG. 4C.

If a rule is in the "FAIL" state and mentions a broad type of security, a security subgroup, or a security type entity, the path the rule is on is considered not to accept positions of that security type. Likewise, if a rule in the "FAIL" state mentions the position currency, then the path the rule is on is considered not to accept positions with the same position currency. Such currency positions may not be acceptable due to perceived or actual weakness or risk involved with a currency of a particular type.

Turning now to FIG. 4B, at step S460, the security position has been found to be eligible on every rule in a given path, and the algorithmic "binary tree" processing ends. However, outside of the ruleset, there are other user-definable reasons why a security position might not be eligible or desirable as collateral for a trade. Exemplary checks begin at step S470 and continue on through step S495.

For example, if the market value of the security position is zero, this security would not be eligible for collateralization, and a zero price warning would be reported/output at step S475. As another example, if a minimum number of shares that can be held in a security position ("par") is less than a minimum par value at step S480, a warning/report is provided at step S485. If the par value related to the security position is greater than the minimum par value, but less than a required multiple par value, at step S490, an evaluation is made, and an appropriate report/warning is made at step S495.

At step S500, all eligible or reported paths are iteratively checked to confirm that each path has at least one full margin. A full margin is a price premium used in connection with various securities having different liquidities and relative risk. If a full margin is not provided, a warning is reported at step S510 that no margin has been found. Incremental margins may also be used.

At step S515, all eligible or reported paths are iteratively checked and, if any rule contains a concentration limit, collateral eligibility module 142 will confirm that sufficient data exists at step S525 to calculate the concentration limit. If the eligible path rules do not contain a concentration limit, then processing stops at step S520. If sufficient data to calculate a concentration limit does not exist, then a missing data report is generated at step S530, and the processing ends at step S520. If sufficient data to calculate a concentration limit is found at step S525, then a report that market concentration data exists is provided at step S535.

In FIG. 4C, at step S465, the security position has been found ineligible based upon the binary logic tree processing algorithm. However, at step S540, the set of path(s) where a generic position matching the security type and position currency is reviewed. The path(s) with the highest "PASS/FAIL" ratio is used for reporting purposes at step S545. All rules in a FAIL state on these paths are reported at step S550 as reasons why the security position is not eligible for collateralization. Processing at step S555 proceeds to step S460 (letter "A") in FIG. 4B. If, at step S540 there are no paths where generic position matching of both security type and position currency is found, then paths with generic position matching of only the security type is reviewed at step S560. Again, path(s) with the highest "PASS/FAIL" ratio is used for reporting purposes at step S545, and all rules in a FAIL state on these paths are reported at step S550 as reasons why the security position is not eligible for collateralization.

If steps S540 and S560 do not find any reasons for collateral ineligibility, then step S565 assumes that the reason for ineligibility is that the security type of the security position is not eligible in the given ruleset. Processing at step S555 proceeds to step S460 (letter "A") in FIG. 4B.

In an embodiment, if a concentration limit will apply for an eligible position, the limit may be indicated along with the eligibility at step S535. In some embodiments, the path(s) through which the concentration limits would pass may be indicated in the report. In an embodiment, the reports generated by method 400 may indicate an amount (e.g., par and value) that could be allocated to a given account. In some embodiments, one or more disclaimers may be presented in the reports. For example, a disclaimer regarding uncertainty over a group concentration limit may be presented, because the group concentration limit and the par/value amount may only be valid at the time the position eligibility allocation was performed in the method 400.

It may be appreciated that in some embodiments, the system and method of this disclosure may be configured so as to make use of inputs provided by the party 110, the party 111, or any other party, to determine collateral eligibility. For example, a dealer of the parties 110,111 may be able to load data (e.g., as a data file) into the collateral management system 140 through the network 130 (e.g., into an embodiment of a GUI similar to that of FIGS. 2 and 3, or any other interface associated with the operator input/output and display module 149). The data may contain information regarding the dealer's inventory of collateral, and may be processed through the collateral management system 140 to determine eligibility of each of the collateral/positions in their inventory. While in some embodiments the data may be processed daily (e.g., with the dealer's present unallocated collateral), in other embodiments the data may include collateral that the dealer is potentially acquiring, which may be useful to determine whether such collateral should be acquired.

In some embodiments, reports generated by the collateral management system 140 (e.g., through the reporting and messaging module 145) may be transmitted back to the dealer party 110 or 111, in any appropriate format. For example, in some embodiments where the data is presented as a data file, the data file may be modified to note the eligibility or ineligibility of the collateral noted therein. For example, where the data file is a spreadsheet, a new set of data (e.g., a new column) may be added for the position eligibility. Where space for position eligibility is already allocated in the data, (e.g. as an empty column designated for the position eligibility data, or a column containing past eligibility determinations for one or more of the collaterals) the processing of the collateral management system 140 may be for the collateral that does not already have an eligibility determination associated therewith. In some embodiments, collateral already having a past position eligibility determination in the data may be verified or re-verified. Determining whether to process collateral to verify or re-verify past eligibility determinations may be an option selected in the GUI, or other control associated with the collateral management system 140.

In an embodiment, the data loaded into the collateral management system 140 may include the instructions associated with processing the data, including, for example, whether to verify any existing collateral eligibility determinations contained within the data. Other instructions for processing the data may also be included with the data, such as instructions regarding the content of the report generated, how the processing by the collateral management system 140 proceeds, and how the report is transmitted back to the party 110 and/or 111. For example, in some embodiments the reports may be formatted to be viewed on an internet website, and may be stored (e.g., on the memory storage device 147) for access over the network 130. In other embodiments, the reports may be transmitted as an updated data file (e.g., a spreadsheet, or any other appropriate data set), which may be received by the party 110 or 111, and may be utilized in their own financial processing systems. In an embodiment, if a position is determined to be eligible (or, in the case of a collateral optimization, if the position is determined to be more optimal), but the position is not held by a dealer associated with the entity operating the collateral management system 140 the report may comprise market instructions to deliver the positions to the entity operating the collateral management system 140 on behalf of the associated party 110 or 111.

Although in some of the embodiments described above the report generated by the collateral management system 140 may generally indicate eligibility or ineligibility of particular collateral for particular accounts, it may be appreciated that in some embodiments the collateral management system 140 may alternatively or additionally present information to the dealer regarding utilization of such collateral. For example, in an embodiment, the eligible collateral may be run through an optimization simulation, to project potential results if certain ones of the eligible positions were selected for matching with the associated accounts. The simulation may show how the eligible collateral may be best pledged in an optimized manner, depending upon one or more of a variety of optimization criteria. In an embodiment where current positions are disclosed or accessible by the collateral management system 140, the optimization simulation may be configured to selectively maintain or modify those positions, and modify the projection accordingly. In some embodiments where the current positions are knowable by the collateral management system 140, the potential number of shares of the position which could be allocated in an account may be reported with the position's eligibility. While the optimizations may vary across embodiments, in some embodiments one or more of the optimizations may be similar to those described in U.S. patent application Ser. No. 13/362,980, incorporated in its entirety herein by reference.

It may be appreciated that the system and method of this disclosure may be utilized in a "pre-deal" scenario, i.e., after agreement between the parties but before the deal becomes active. Further, the system and method of this disclosure may be utilized in a "post-deal" scenario, i.e., after agreement between the parties and after the deal becomes active. It may be appreciated that in some embodiments, determination of position eligibility may otherwise be configured to operate in a projected mode, which may comprise data analysis utilizing future dates. As such, while in some embodiments the collateral management system 140 may operate in a "live" (e.g., event driven) mode that utilizes real data, the projected mode might utilize dates that are in the future. In an embodiment, if one or more dates of entry are future dates, the collateral management system 140 may be configured to account for such future dates when managing entities that determine eligibility based on dates (e.g., Record Date, Months of Maturity, Days to Maturity, and so on).

In an embodiment where the collateral management system 140 and/or associated systems are configured to determine position eligibility and perform optimization of allocations, the output of the position eligibility determination may be utilized to drive allocations. It may be appreciated that when optimization is requested (either in live mode or projected mode) the results of the eligibility determination may be fed directly to the optimization system, so that the optimization system would not need to calculate eligibility as a separate step. Such sharing of the eligibility determination throughout the system or across systems may therefore increase a speed of optimizing collateral allocations.

In an embodiment where the collateral management system 140 is ascertaining position eligibility for tri-party repurchase agreements, the collateral management system 140 may be configured to determine eligible replacement collateral to allocate to a tri-party as a result of a delivery instruction when the delivery cannot be fulfilled from a long box.

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A data processing system for managing collateral risk associated with a trade of a financial instrument, the system comprising:
    memory coupled to a computer system, the memory containing a database therein configured to store one or more rulesets relating to determining eligibility of collateral to be considered for a desired trade, wherein each ruleset is a set of logical operators which results in the determination of the eligibility of collateral; and
    the computer system comprising one or more processors programmed by computer program instructions that, when executed, cause the computer system to:
        optimize the one or more rulesets by iteratively expanding the logical operators into a binary decision tree comprising a one or more paths to determine the determination of the eligibility of collateral;
        receive, via a user interface of the computer system, a selected account which comprises one or more security positions to selectively run a collateral eligibility check on;
        receive information regarding the one or more security positions of the selected account potentially eligible for use as collateral;
        determine a collateral preference ranking of the one or more security positions eligible for use as collateral for the trade by applying the ruleset via an algorithm executed by the computer system so as to confirm an eligibility of the one or more security positions eligible for use as collateral for the trade by testing in accordance with the ruleset;
        determine which of the one or more security positions potentially eligible for use as collateral are eligible for use as collateral; and
        responsive to the determination of said one or more security positions, causing said one or more processors to display a relative collateral preference indication of the one or more security positions eligible for use as collateral based on the collateral preference ranking on the user interface of the computer system.

2. The system of claim 1, wherein the computer system is a distributed computing system comprising a plurality of interconnected processors.

3. The system of claim 1, wherein the user interface is access restricted based on a user login.

4. The system of claim 3, wherein the user login determines which of the one or more security positions eligible for use as collateral for the trade are displayed to the user.

5. The system of claim 1, wherein the user interface comprises a text box configured to receive security identifiers associated with the one or more security positions potentially eligible for use as collateral.

6. The system of claim 1, wherein the computer system is configured to receive a data file comprising the information regarding the one or more security positions potentially eligible for use as collateral.

7. The system of claim 6, wherein the data file comprises a dealer's daily inventory of collateral.

8. The system of claim 1, wherein the information comprises error checking data configured to verify that the information correctly identifies one or more security positions.

9. The system of claim 1, wherein the information pertains to one or more of individual security positions, indexes, or groups or securities.

10. The system of claim 1, wherein the user interface further comprises a search feature configured to search across known security positions and allow for selection of the one or more security positions potentially eligible for use as collateral.

11. The system of claim 10, wherein the search feature configured to search across known security position is part of the computer system, and is further configured to search for accounts or groups of accounts that could potentially accept a security position therein.

12. The system of claim 1, wherein the computer system is further programmed to determine which of the one or more security positions potentially eligible for use as collateral are the one or more security positions eligible for use as collateral based on one or more selected accounts or groups of accounts.

13. The system of claim 1, wherein the computer system is further programmed to report eligibility of the one or more security positions eligible for use as collateral for the trade.

14. The system of claim 13, wherein the computer system is further programmed to report the eligibility by generating a data file.

15. The system of claim 14, wherein the data file comprises one or more of a spreadsheet, a web page, and a data set.

16. The system of claim 1, further comprising a plurality of rulesets, each of the plurality of rulesets being associated with a particular account.

17. The system of claim 16, wherein the computer system is further programmed to determine a collateral preference ranking for each of the particular accounts by applying each of the plurality of rulesets via algorithms executed by the computer system so as to provide a collateral eligibility check for each of the particular accounts by testing in accordance with an associated ruleset of the plurality of rulesets.

18. The system of claim 17, wherein the collateral eligibility check for each of the particular accounts is stored in the memory as a downloadable spreadsheet.

19. The system of claim 17, wherein the collateral eligibility check for each of the particular accounts is stored in the memory and displayed on the user interface of the computer system.

20. The system of claim 19, wherein the user interface displays a collateral value and a margin requirement for each collateral-eligible security.

21. The system of claim 1, wherein the computer system is further programmed to:
validate the accuracy of the one or more rulesets by testing the eligibility of various collaterals with a pre-determined eligibility profile; and
report any discrepancies in response to the determined eligibility of the various collaterals being different than the pre-determining eligibility profile.

22. A computer-implemented method for managing collateral risk associated with a trade of a financial instrument, the method being implemented in a computer system having one or more processors programmed with computer-executable instructions stored on a non-transitory computer-readable medium that, when executed by the one or more processors, cause the computer system to perform the method, the method comprising:
receiving, via a user interface of the computer system, a selected account which comprises security positions to selectively run a collateral eligibility check on;
receiving, via the computer system, information regarding the security positions of the selected account potentially eligible for use as collateral;
storing, in memory coupled to the computer system, one or more user-definable rulesets relating to determining eligibility of collateral, wherein each ruleset is a set of logical operators which results in the determination of the eligibility of collateral;
optimizing, via the computer system, the one or more user-definable rulesets by iteratively expanding the logical operators into a binary decision tree comprising a one or more paths to determine the determination of the eligibility of collateral;
determining, via the computer system, an eligibility of the potentially eligible security positions as collateral for the trade by applying one or more user-definable rulesets in an algorithm executed by the one or more processors by testing an eligibility of each of the potentially eligible security positions as collateral for the trade, the testing an eligibility comprising testing an eligibility along each of a plurality of logical paths defined by the one or more user-definable rulesets;
determining, via the computer system, which of the security positions potentially eligible for use as collateral are eligible for use as collateral; and
responsive to said determining, causing said one or more processors for displaying, via the user interface of the computer system, a relative collateral preference indication of the security positions eligible for use as collateral based on the collateral preference ranking on the user interface of the computer system.

23. The method of claim 22, wherein the method further includes:
validate the accuracy of the one or more user-definable ruleset by testing the eligibility of various collaterals with a pre-determined eligibility profile; and report any discrepancies in response to the determined eligibility of the various collaterals being different than the pre-determining eligibility profile.

24. An article of manufacture comprising a tangible computer-readable medium that contains computer-executable code thereon which, when executed by a computer system comprising one or more processors, causes the computer system to carry out functions that manage collateral risk associated with a trade of a financial instrument, wherein the executed code is operable to:

receive, via a user interface of the computer system, a selected account which comprises security positions to selectively run a collateral eligibility check on;

receive information regarding the security positions of the selected account potentially eligible for use as collateral;

storing, in memory coupled to the computer system, one or more user-definable rulesets relating to determining eligibility of collateral, wherein each ruleset is a set of logical operators which results in the determination of the eligibility of collateral;

optimizing, via the computer system, the one or more user-definable rulesets by iteratively expanding the logical operators into a binary decision tree comprising a one or more paths to determine the determination of the eligibility of collateral;

determine an eligibility of potentially eligible security positions as collateral for the trade by applying one or more user-definable rulesets in an algorithm executed by the computer system by testing an eligibility of each of the potentially eligible security positions as collateral for the trade, the testing an eligibility comprising testing an eligibility along each of a plurality of logical paths defined by the one or more user-definable rulesets;

determine which of the security positions potentially eligible for use as collateral are eligible for use as collateral; and causing said one or more processors to display a relative collateral preference indication of the security positions eligible for use as collateral based on the collateral preference ranking on the user interface of the computer system.

25. The article of manufacture of claim 24, wherein the computer system is further programmed to:

validate the accuracy of the one or more user-definable ruleset by testing the eligibility of various collaterals with a pre-determined eligibility profile; and report any discrepancies in response to the determined eligibility of the various collaterals being different than the pre-determining eligibility profile.

* * * * *